United States Patent
Sakata

(10) Patent No.: US 6,941,212 B2
(45) Date of Patent: Sep. 6, 2005

(54) STABILITY FACTOR LEARNING METHOD AND APPARATUS FOR A VEHICLE AND CONTROL APPARATUS FOR A VEHICLE

(75) Inventor: Kunio Sakata, Tokyo (JP)

(73) Assignee: Mitsubishi Fuso Truck and Bus Corporation, (JP)

( * ) Notice: Subject to any disclaimer, the term of this patent is extended or adjusted under 35 U.S.C. 154(b) by 0 days.

(21) Appl. No.: 10/953,515

(22) Filed: Sep. 29, 2001

(65) Prior Publication Data

US 2005/0102085 A1    May 12, 2005

(30) Foreign Application Priority Data

Sep. 30, 2003  (JP) .............................. 2003-341508

(51) Int. Cl.[7] .............................................. G06G 7/70
(52) U.S. Cl. ........................... 701/72; 701/44; 701/70; 701/77
(58) Field of Search .............................. 701/1, 41, 42, 701/44, 70, 71, 72, 74, 75, 77; 180/197, 40, 180/41, 443, 446, 421

(56) References Cited

U.S. PATENT DOCUMENTS 5,964,819 A * 10/1999 Naito .......................... 701/72
6,360,147 B1 * 3/2002 Lee ............................. 701/35
6,708,088 B2 * 3/2004 Matsuno et al. ................ 701/1
6,719,088 B2 * 4/2004 Nakano et al. ............. 180/402
6,865,469 B2 * 3/2005 Batistic et al. ................ 701/72

FOREIGN PATENT DOCUMENTS

| JP | 2000-344075 A | 12/2000 |
| JP | 2000-346869 A | 12/2000 |
| JP | 3257354 B2 | 12/2001 |

* cited by examiner

Primary Examiner—Richard M. Camby
(74) Attorney, Agent, or Firm—Rossi, Kimms & McDowell, LLP

(57) ABSTRACT

The invention provides a technique for learning a stability factor of a vehicle by which the stability factor of the vehicle can be calculated in response to a state of the vehicle. To this end, a state of the vehicle during traveling is detected, and it is decided based on the detection information whether or not the current traveling state of the vehicle is a stable turning state. If it is decided that the current traveling state of the vehicle is a stable turning state, then the stability factor of the vehicle is calculated in accordance with a predetermined arithmetic operation expression based on a vehicle speed, a steering angle and a yaw rate detected during traveling, and the calculated value is determined as a learned value of the stability factor of the vehicle thereby to determine the stability factor in the current state of the vehicle.

10 Claims, 8 Drawing Sheets

FIG. 4(a)
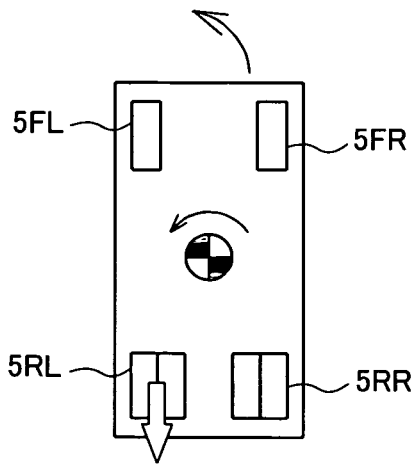
UPON US
FIG. 4(b)
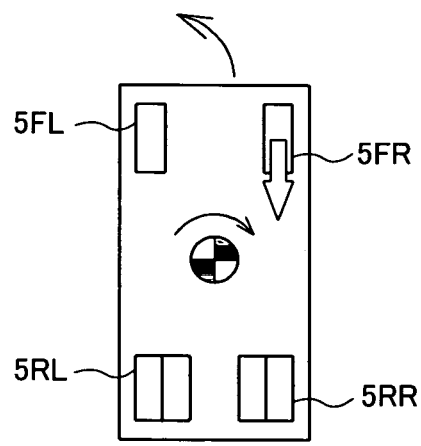
UPON OS
FIG. 4(c)
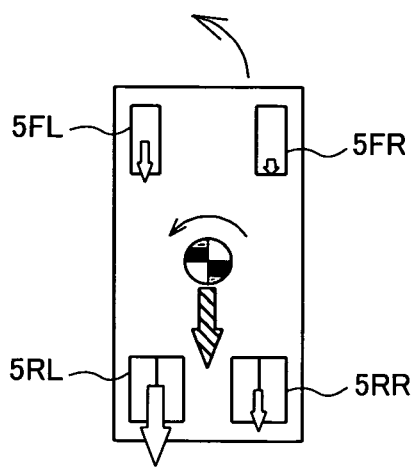
UPON US
FIG. 4(d)
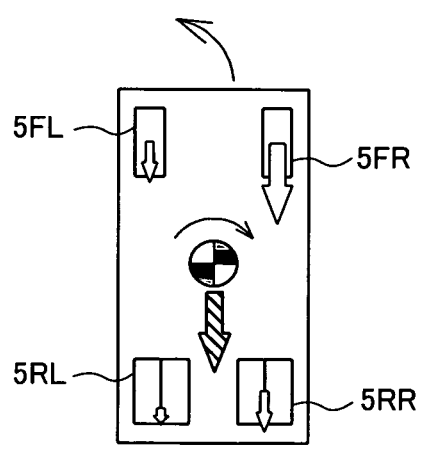
UPON OS
 VEHICLE POSTURE CONTROL
 YAW MOMENT GENERATED ON VEHICLE BODY
 DECELERATION GENERATED ON VEHICLE BODY

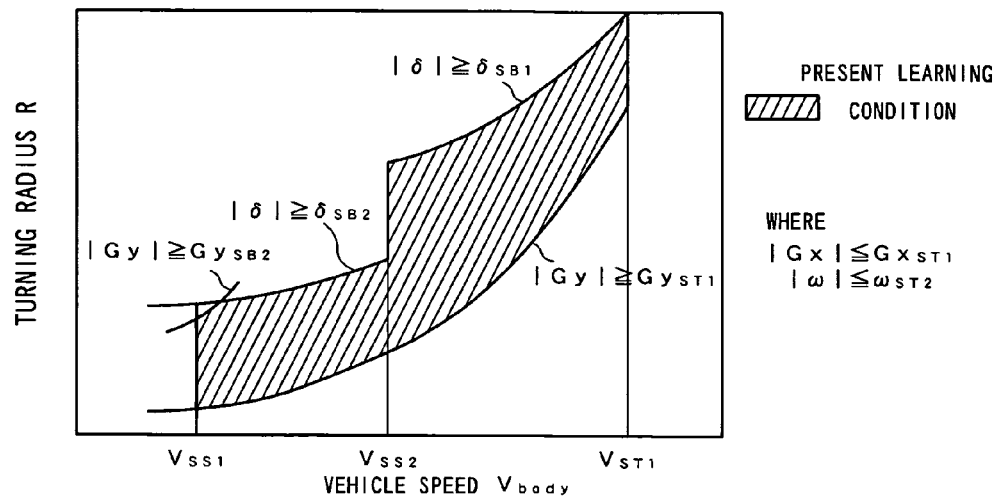
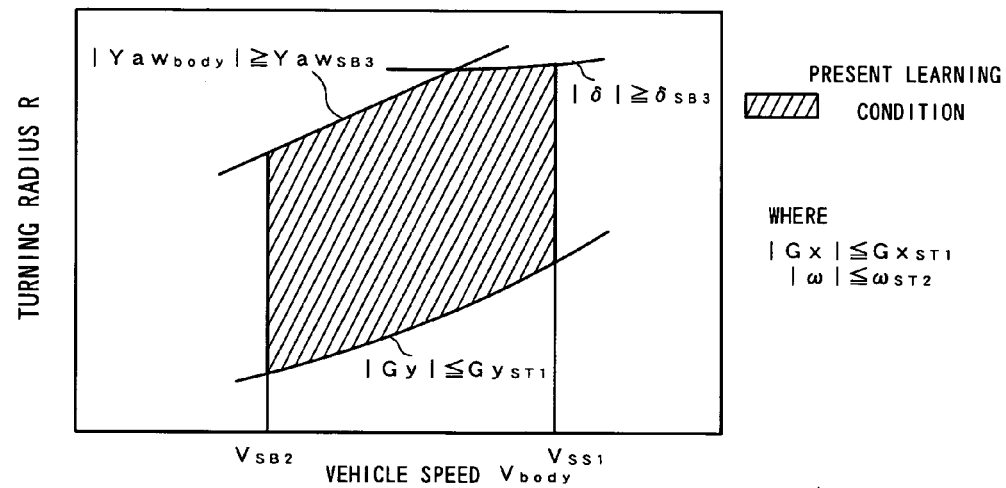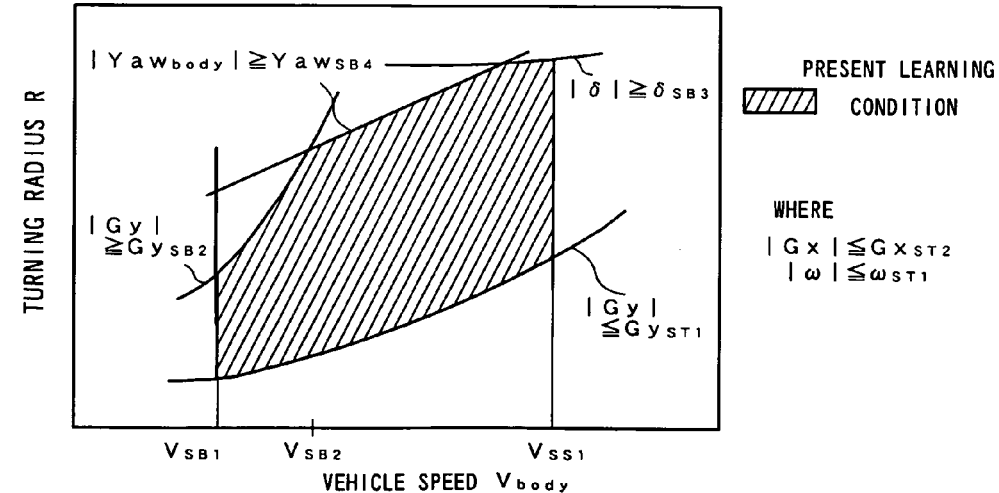

STABILITY FACTOR LEARNING METHOD AND APPARATUS FOR A VEHICLE AND CONTROL APPARATUS FOR A VEHICLE

BACKGROUND OF THE INVENTION

1. Field of the Invention

This invention relates to a technique for learning a stability factor of a vehicle.

2. Description of the Related Art

Techniques are known which use a stability factor of an automobile (hereinafter referred to as vehicle) in order to control the vehicle upon traveling of the vehicle.

For example, as a technique for controlling the posture of a vehicle upon turning, braking force is applied to a particular wheel or wheels upon turning to control a steering characteristic (yaw moment) of the vehicle to correct the posture of the vehicle upon turning with respect to the turning direction to achieve traveling stability of the vehicle (refer to, for example, Japanese Patent No. 3,257,354 (hereinafter referred to as Document 1)).

According to the technique disclosed in Document 1, yaw moment control is carried out in response to the deviation between a target yaw rate calculated using a standard two-wheeled model and an actual yaw rate detected by a sensor. For the calculation of the target yaw rate $Y_A$, a stability factor A indicative of the steering characteristic of the vehicle is used as in the following expression:

$$Y_A = LPF2[LPF1\{Vb/(1+A \times Vb^2) \times (\delta/L)\}]$$

where LPF1 and LPF2 represent low-pass filter processes, and Vb represents the vehicle speed, $\delta$ the steering angle, and L the wheel base.

Incidentally, for the stability factor for use for control of a vehicle beginning with such posture control of a vehicle as described above, usually a fixed value suitable for the vehicle is used. In particular, a steady traveling test or the like is performed, and a stability factor A is calculated from a vehicle speed V, a steering angle $\delta$ and a yaw rate $\omega$ obtained then. Then, for the same vehicle model, the calculated stability factor A of a fixed value is used to perform control.

However, the stability factor of a vehicle varies depending upon the state of the vehicle (for example, the position of the center of gravity, tyres, the rigidity of the vehicle and so forth). Therefore, where a fixed value is used as described above, it is sometimes impossible to perform appropriate control for the vehicle suitable for various situations of the vehicle. This is a significant subject particularly with commercial vehicles such as trucks and vans with which the load situation varies significantly and buses and so forth on which a great number of people get.

SUMMARY OF THE INVENTION

It is an object of the present invention to provide a stability factor learning method and apparatus for a vehicle and a control apparatus for a vehicle by which a stability factor of the vehicle can be calculated in response to a state of the vehicle so that, for example, control of the vehicle can be performed appropriately in conformity with the state of the vehicle.

In order to attain the object described above, according to an aspect of the present invention, there is provided a stability factor learning method for a vehicle for learning a stability factor of the vehicle in a state of the vehicle during traveling, comprising a decision step of detecting a state of the vehicle during traveling and deciding based on the detection information whether or not the current traveling state of the vehicle is a stable turning state, and a learning step of calculating, based on a vehicle body speed $V_{body}$, a steering angle $\delta$ and a yaw rate $Yaw_{body}$ detected during traveling, a stability factor A of the vehicle in accordance with an arithmetic operation expression (1)

$$A = \left(\frac{V_{body} \cdot \delta}{Yaw_{body} \cdot L} - 1\right)\frac{1}{V_{body}^2} \quad (1)$$

and then setting, if it is decided at the decision step that the current traveling state of the vehicle is a stable turning state, the calculated value as a learned value of the stability factor A of the vehicle.

With the stability factor learning method for a vehicle, it is decided whether or not the traveling state of the vehicle during traveling is a stable turning state. Then, if the traveling state is a stable turning state, then the stability factor A of the vehicle is calculated based on the detection data of the vehicle body speed $V_{body}$, steering angle $\delta$ and yaw rate $Yaw_{body}$ obtained during traveling. Consequently, the stability factor of the vehicle can be calculated in accordance with the state of the vehicle.

Accordingly, if the stability factor A obtained by the present learning method is used to perform control of the vehicle, then the control of the vehicle can be performed appropriately in accordance with the state of the vehicle.

Preferably, a decision condition that the current traveling state of the vehicle is a stable turning state at the decision step is that all of a first condition that the magnitude of the yaw rate of the vehicle is equal to or higher than a predetermined value set in advance, a second condition that the magnitude of a forward-backward acceleration of the vehicle is lower than a predetermined value set in advance, a third condition that the magnitude of a lateral acceleration of the vehicle is within a range set in advance, a fourth condition that the vehicle speed is within a range set in advance, a fifth condition that the magnitude of a steering angular velocity of the vehicle is smaller than a predetermined value set in advance and a sixth condition that the magnitude of the steering angle of the vehicle is equal to or greater than a predetermined value set in advance are satisfied, and a learning condition that the calculated value according to the arithmetic operation expression (1) at the learning step is set to the learned value of the stability factor A of the vehicle is set to that the state wherein all of the first to sixth conditions are satisfied continues for a predetermined period of time set in advance or more.

Preferably, at the learning step, if all of the first to sixth conditions are satisfied, the stability factor A is calculated repetitively in a predetermined cycle until any of the first to sixth conditions becomes unsatisfied, and then upon the arithmetic operation, if the state wherein all of the first to sixth conditions are satisfied continues for the predetermined period of time or more, an average value of results of the arithmetic operation performed in the predetermined cycle is calculated and used to update the learned value of the stability factor A of the vehicle.

Preferably, the predetermined values and the ranges included in the decision condition are set to those which differ among different turning modes of the vehicle (for example, whether the turning is turning along a curved road wherein the vehicle speed is comparatively high or turning such as turning to the right or turning to the left at a crossing or the like wherein the vehicle speed is comparatively low). Further preferably, when the turning speed of the vehicle is a low vehicle speed corresponding to that upon turning to the right or turning to the left, the predetermined values and the ranges included in the decision condition are set to those which differ between turning to the left and turning to the right.

According to another aspect of the present invention, there is provided a stability factor learning apparatus for a vehicle for use with the stability factor learning method for a vehicle described above, comprising vehicle state detection means for detecting a traveling state or an operation state of the vehicle, the vehicle state detection means including yaw rate detection means for detecting a yaw rate generated on the vehicle, vehicle speed detection means for detecting a vehicle speed and steering angle detection means for detecting a steering angle of the vehicle, decision means for deciding based on the detection information from the vehicle state detection means whether or not the current traveling state of the vehicle is a stable turning state, and learned value setting means for calculating, based on a vehicle body speed $V_{body}$, a steering angle δ and a yaw rate $Yaw_{body}$ obtained from the vehicle state detection means during traveling while it remains decided by the decision means that the current traveling state of the vehicle is a stable turning state, a stability factor A of the vehicle in accordance with the arithmetic operation expression (1) and then setting the calculated value as a learned value of the stability factor A of the vehicle.

With the stability factor learning apparatus for a vehicle, it is decided whether or not the traveling state of the vehicle during traveling is a stable turning state. Then, if the traveling state is a stable turning state, then the stability factor A of the vehicle is calculated based on the detection data of the vehicle body speed $V_{body}$, steering angle δ and yaw rate $Yaw_{body}$ obtained during traveling. Consequently, the stability factor of the vehicle can be calculated in accordance with the state of the vehicle.

Accordingly, if the stability factor A obtained by the present learning method is used to perform control of the vehicle, then the control of the vehicle can be performed appropriately in accordance with the state of the vehicle.

According to a further aspect of the present invention, there is provided a control apparatus for a vehicle, comprising the stability factor leaning apparatus for a vehicle described above, and control means for controlling the vehicle based on a stability factor learned value learned by the learning apparatus, a controlling stability factor for use for the control of the vehicle being determined by weighted averaging a controlling stability factor in a preceding cycle and the latest stability factor learned value with weighting coefficients set in advance.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 4(a) to 4(d) are schematic views illustrating yaw moment control as the vehicle control in the embodiment of the present invention;

FIGS. 5(a) to 5(c) are diagrams illustrating stable turning decision conditions used in a learning method according to the embodiment of the present invention;

DESCRIPTION OF THE PREFERRED EMBODIMENT

Figure 2:
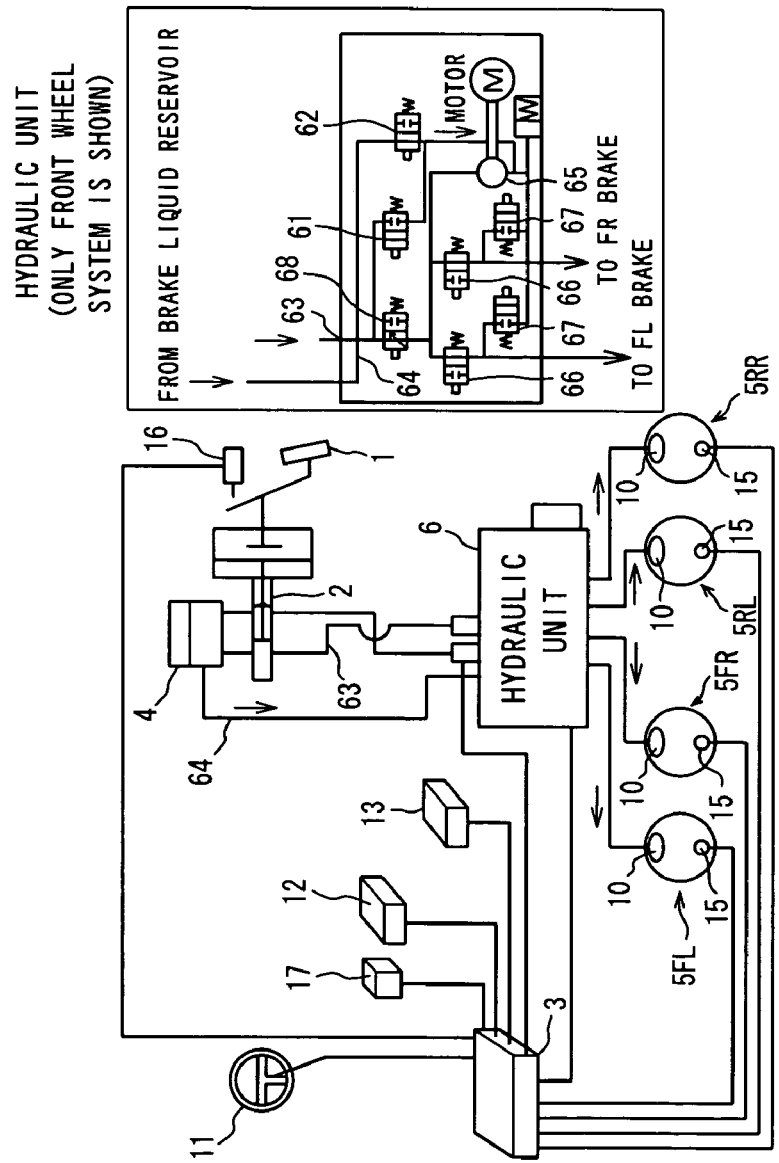
FIG. 2 is a system diagram of a brake system of the control apparatus for a vehicle.
Figure 3:
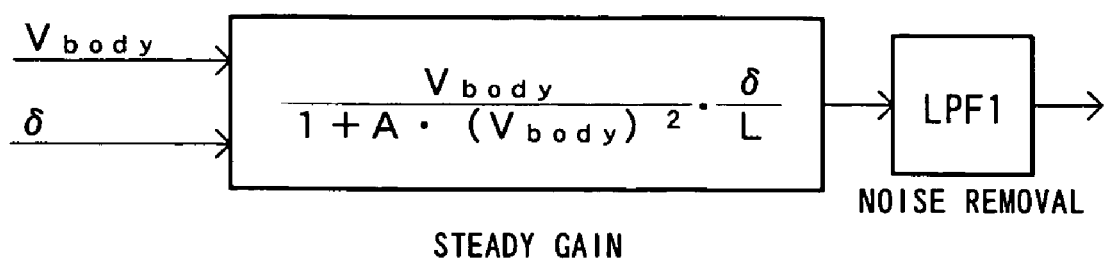
FIG. 3 is a diagrammatic view illustrating calculation of a target yaw rate to be used for yaw moment control as vehicle control in the embodiment of the present invention.

A stability factor learning apparatus according to an embodiment of the present invention is provided in a form wherein it is applied to a yaw moment control apparatus (steering characteristic control apparatus) as a control apparatus for a vehicle. The yaw moment control apparatus is incorporated in such a braking system for a vehicle as shown in FIG. 2. Therefore, the braking system for a vehicle is described first.

Referring to FIG. 2, the braking system for a vehicle includes a brake pedal 1, a master cylinder 2 which operates in an interlocking relationship with an operation of the brake pedal 1, and a hydraulic unit 6 for controlling the brake fluid pressure to be supplied from the master cylinder 2 in response to the state of the master cylinder 2 or from a brake fluid reservoir 4 in response to an instruction from a braking controller (brake ECU) 3 to wheel cylinders of wheel brakes (hereinafter referred to as brakes) 10 for braking wheels (front left and right wheels and rear left and right wheels) 5FL, 5FR, 5RL, 5RR. It is to be noted here that a braking mechanism is formed from a liquid pressure adjusting system including the master cylinder 2, hydraulic unit 6 and so forth and the brakes 10 for the braking wheels and so forth.

As seen in FIG. 2 (in FIG. 2, only the left and right wheel brakes for the front wheels are shown), when the vehicle is in a yaw moment control mode, a differential pressure regulating valve 68 in the hydraulic unit 6 operates so that a predetermined pressure difference may appear between the upstream and the downstream of the differential pressure regulating valve 68.

When the vehicle is in the yaw moment control mode and the brake pedal 1 is not operated, an in-line intake valve 61 is closed while an out-line intake valve 62 is opened. Consequently, the brake fluid in the brake fluid reservoir 4 is introduced through an out-line 64, the out-line intake valve 62 and a pump 65 and is pressurized by the pump 65, and the pressure of the brake liquid is adjusted by a liquid pressure holding valve 66 and a pressure reducing valve 67 and the brake liquid of the adjusted pressure is supplied to the brakes 10 for the wheels.

When the vehicle is in the yaw moment control mode and the brake pedal 1 is operated, since the in-line intake valve 61 is opened and the out-line intake valve 62 is closed, the brake fluid in the master cylinder 2 is introduced through an in-line 63, the in-line intake valve 61 and the pump 65 and pressurized by the pump 65. Then, the pressure of the brake fluid is adjusted by the liquid pressure holding valve 66 and the pressure reducing valve 67, and the brake fluid of the adjusted pressure is supplied to the brakes 10 for the wheels.

During the yaw moment control, braking control wherein both of braking control according to the magnitude of the yaw moment and braking control according to the operation amount of the brake pedal 1 are combined can be carried out.

It is to be noted that the in-line 63 and the out-line 64 join together on the downstream of the in-line intake valve 61 and the out-line intake valve 62, and the pump 65 is disposed on the downstream of the joining location. The liquid pressure holding valve 66 and the pressure reducing valve 67 are provided for each of the braking wheels 5FL, 5FR, 5RL, 5RR on the downstream of the pump 65.

Upon normal braking, the in-line intake valve 61 and the out-line intake valve 62 are closed, and the differential pressure regulating valve 68 and the liquid pressure holding valve 66 are opened while the pressure reducing valve 67 is closed. Consequently, a brake fluid pressure corresponding to the pressure (that is, braking operation force) in the master cylinder 2 is supplied to the brake 10 for each of the wheels through the in-line 63, differential pressure regulating valve 68 and liquid pressure holding valve 66. On the other hand, when an ABS (antilock brake system or antiskid brake system) operates, a brake fluid pressure corresponding to the braking operation force is suitably adjusted through the liquid pressure holding valve 66 and the pressure reducing valve 67 so that each wheel may not be locked.

The in-line intake valve 61, out-line intake valve 62, pump 65, liquid pressure holding valves 66 and pressure reducing valves 67 for the braking wheels, and differential pressure regulating valve 68 of the hydraulic unit 6 having such a configuration as described above are controlled by the brake ECU 3.

Various signals are inputted to the brake ECU 3. In particular, a steering wheel angle signal is inputted from a steering wheel angle sensor 11 provided for a steering wheel, and a yaw rate signal of the vehicle body is inputted from a yaw rate sensor 12 provided on the vehicle body. Further, a master cylinder fluid pressure signal is inputted from a master cylinder fluid pressure sensor 14, and vehicle speed (wheel speed) signals are inputted from wheel speed sensors 15. Furthermore, a brake pedal operation signal is inputted from a brake switch 16, and a forward-backward acceleration signal and a lateral acceleration signal are inputted from a forward-backward and lateral acceleration sensor 17 provided on the vehicle body. It is to be noted that the wheel speed signals from the wheel speed sensors 15 are converted into a vehicle speed (vehicle body speed), and therefore, the wheel speed sensors 15 function also as a wheel speed sensor.

Figure 1:
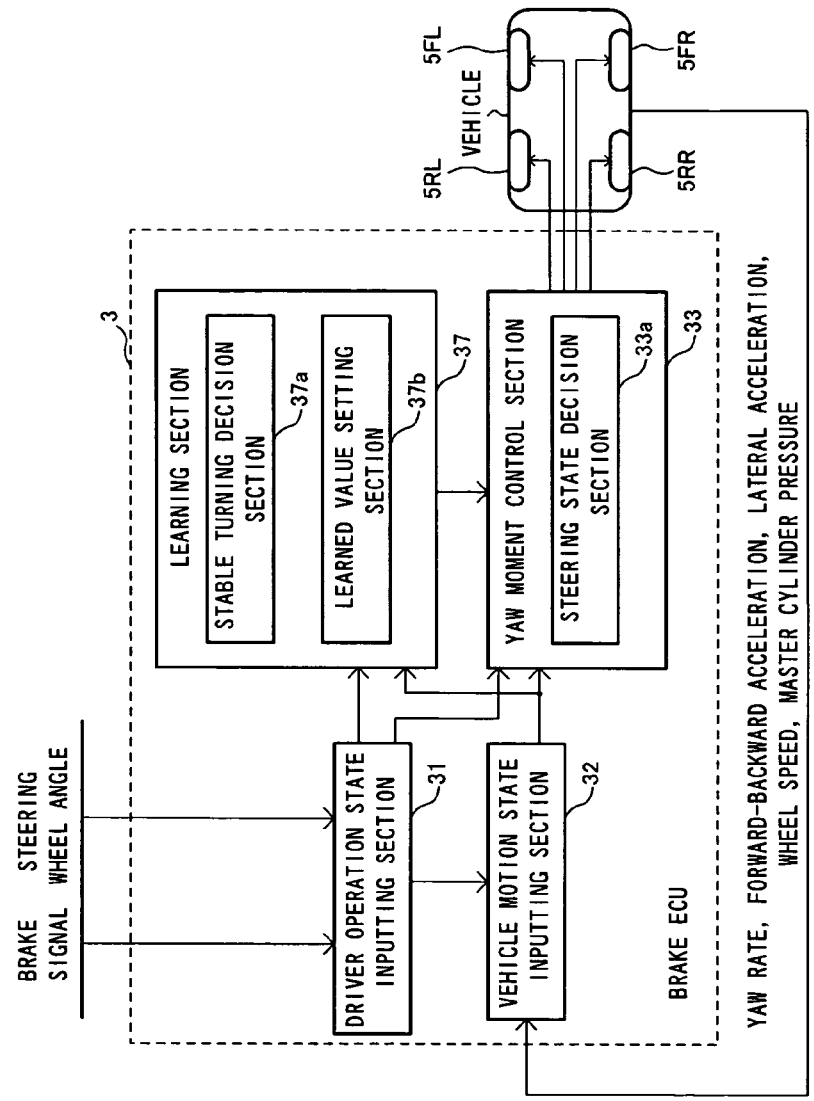
FIG. 1 is a block diagram showing a configuration of a learning apparatus and a control apparatus for a vehicle according to an embodiment of the present invention.

The brake ECU 3 includes such various functional elements as seen in FIG. 1. In particular, referring to FIG. 1, the brake ECU 3 includes a driver operation state inputting section 31 for receiving various information relating to an operation state of the driver as an input thereto, suitably processing the input information and outputting resulting information. The brake ECU 3 further includes a vehicle motion state inputting section 32 for receiving various information relating to a motion state (behavior) of the vehicle, suitably processing the input information and outputting resulting information, a yaw moment control section (steering characteristic control section) 33, and a stability factor learning section 37.

The driver operation state inputting section 31 decides whether or not the brake pedal 1 is operated from a brake pedal operation signal from the brake switch 16 and time differentiates a steering wheel angle based on a steering wheel angle signal from the steering wheel angle sensor 11 to calculate a steering wheel angular velocity (steering angular velocity).

The vehicle motion state inputting section 32 recognizes an actual yaw rate occurring with the vehicle body from a yaw rate signal from the yaw rate sensor 12 and calculates a vehicle body speed, a target yaw rate and a yaw rate deviation. Although the vehicle body speed is normally calculated based on the wheel speed signals from the wheel speed sensors 15, if a slip occurs with a wheel, then the vehicle motion state inputting section 32 adds a time integrated value of a forward-backward acceleration obtained from the forward-backward and lateral acceleration sensor 17 to the vehicle body speed obtained till then based on the wheel speed signals to calculate the vehicle body speed (in this instance, the calculated vehicle body speed is an estimated vehicle body speed).

It is to be noted that the target yaw rate $Yaw_{tgt}$ is a yaw rate which should originally be generated on the vehicle and is determined by calculating it from the vehicle body speed $V_{body}$ obtained in such a manner as described hereinabove and an actual steering angle (steering wheel angle) $\delta$ obtained from a steering wheel angle signal from the steering wheel angle sensor 11 in accordance with the following expression (2) and then low-pass filters the calculated value to remove noise from the calculated value:

$$Yaw_{tgt} = \frac{V_{body}}{(1+A \cdot V_{body}^2)} \cdot \frac{\delta}{L} \qquad (2)$$

where A is the stability factor of the vehicle and is obtained by the learning section 37, and L is the wheel base of the vehicle and is a known value found from among the dimensions of the vehicle.

The yaw rate deviation $\Delta Yaw$ is calculated as a difference between the target yaw rate $Yaw_{tgt}$ and the actual yaw rate $Yaw_{body}$ in accordance with the following expression (3):

$$\Delta Yaw = Yaw_{tgt} - Yaw_{body} \qquad (3)$$

It is to be noted that, for example, if the yaw rate direction of the rightward direction is set to the positive sign, then the yaw rate direction of the leftward direction is reversed in sign (multiplied by −1) to perform the calculation described above so that the yaw rate deviation $\Delta Yaw$ may have the positive sign when the vehicle is in an understeer state but have the negative sign when the vehicle is in an oversteer state.

If a predetermined start condition is satisfied, then the yaw moment control section (steering characteristic control section) 33 performs yaw moment control (steering characteristic control) in response to the yaw rate deviation $\Delta Yaw$. The start condition is that both of a condition (i) that the vehicle body speed $V_{body}$ is equal to or higher than a reference value (low speed value set in advance) $V_1$ and another condition (ii) that the yaw rate deviation $\Delta Yaw$ is higher than an understeer (US) start decision threshold value $\Delta Yaw_{us1}$ or an oversteer (OS) start decision threshold value $\Delta Yaw_{as1}$ are satisfied. If both of the two conditions are satisfied, then the yaw moment control is started. It is to be noted that the decision function of (ii) of the yaw moment control section (steering characteristic control section) 33 is represented by steering characteristic decision section 33a.

In the yaw moment control, when the vehicle is in an understeer state, the braking force to turning inner wheels is increased while the braking force to turning outer wheels is decreased. In this instance, if the braking force is applied only to the rear wheel from between the turning inner wheels, then the understeer of the vehicle can be suppressed smoothly and efficiently without slowing down the vehicle excessively. In particular, the braking force application amounts (particularly the brake fluid pressures to be applied) or the braking force increasing amounts or decreasing amounts (the brake fluid pressures to be increased or decreased) are set such that, if a braking operation is not being carried out on the vehicle, then braking force is applied to the rear wheel 5RL or 5RR from between the turning inner wheels as seen in FIG. 4(a), but if a braking operation is being carried out, then the braking force to the rear wheel 5RL or 5RR from between the turning inner wheels is increased while the braking force to the front wheel 5FR or 5FL from between the turning outer wheels is decreased as seen in FIG. 4(c). Further, the braking force application amount (or the braking force increasing amount or decreasing amount) is set in response to the yaw rate deviation ΔYaw such that it increases as the magnitude of the yaw rate deviation ΔYaw increases.

Further, in the yaw moment control, when the vehicle is in an oversteer state, the braking force to turning outer wheels is increased while the braking force to turning inner wheels is decreased. In this instance, if the braking force is applied only to the front wheel from between the turning outer wheels, then the oversteer of the vehicle can be suppressed smoothly and efficiently without slowing down the vehicle excessively. In particular, the braking force application amounts (particularly the brake fluid pressures to be applied) or the braking force increasing amounts or decreasing amounts (particularly the brake fluid pressures to be increased or decreased) are set such that, if a braking operation is not being carried out on the vehicle, then braking force is applied to the front wheel 5FL or 5FR from between the turning outer wheels as seen in FIG. 4(b), but if a braking operation is being carried out, then the braking force to the front wheel 5FL or 5FR from between the turning outer wheels is increased while the braking force to the rear wheel 5RR or 5RL from between the turning inner wheels is decreased as seen in FIG. 4(d). Further, the braking force application amount or the braking force increasing amount and decreasing amount are set in response to the yaw rate deviation ΔYaw such that they increase as the magnitude of the yaw rate deviation ΔYaw increases.

If a predetermined end condition is satisfied while the yaw moment control is being carried out, then the yaw moment control (steering characteristic control) is ended. The end condition is that either one of a condition (i) that the vehicle body speed $V_{body}$ is lower than a reference value (low speed value set in advance) $V_2$ (where $V_2<V_1$) and another condition (ii) that the yaw rate deviation ΔYaw is within an understeer (US) end decision threshold value or an oversteer (OS) end decision threshold value is satisfied. If anyone of the two conditions is satisfied, then the yaw moment control is ended.

Here, a stability factor learning apparatus is described.

The learning apparatus includes a vehicle state detection section for detecting an operation state of the driver and a vehicle state such as a motion state (behavior) of the vehicle, and a learning section 37 provided as a functional element in the brake ECU 3.

The vehicle state detection section includes detection elements for detecting an operation state of the driver such as the steering wheel angle sensor (steering angle detection section) 11 and the brake switch 16 and detection elements for detecting a motion state (behavior) of the vehicle such as the yaw rate sensor (yaw rate detection section) 12, master cylinder fluid pressure sensor 14, wheel speed sensors (vehicle speed sensor) 15 and forward-backward and lateral acceleration sensor 17.

The learning section 37 includes a stable turning decision section (referred to also as decision means) 37a for deciding based on detection information from the vehicle state detection section whether or not the current traveling state of the vehicle is a stable turning state. The learning section 37 further includes a learned value setting section 37b for calculating, while it remains decided by the decision section 37a that the current traveling state of the vehicle is a stable turning state, the stability factor A of the vehicle in accordance with an arithmetic operation expression (1) given below based on the vehicle body speed $V_{body}$ and the yaw rate $Yaw_{body}$ obtained from the vehicle state detection section during traveling of the vehicle and using the calculated value as a learned value of the stability factor A of the vehicle:

$$A = \left(\frac{V_{body} \cdot \delta}{Yaw_{body} \cdot L} - 1\right)\frac{1}{V_{body}^2} \tag{1}$$

The decision section 37a performs a decision of whether or not the current traveling state of the vehicle is a stable turning state based on the yaw rate $Yaw_{body}$ of the vehicle, a lateral acceleration Gy of the vehicle, the vehicle speed $V_{body}$, the steering wheel angular velocity (steering angular velocity) ω of the vehicle and the steering wheel angle (steering angle) δ obtained from the vehicle state detection section and a forward-backward acceleration Gx of the vehicle obtained by differentiating the vehicle speed $V_{body}$.

It is to be noted that, while it is possible to use, as the forward-backward acceleration Gx of the vehicle used here, a value recognized from a forward-backward acceleration signal from the forward-backward and lateral acceleration sensor 17, since the value obtained by differentiating the vehicle speed $V_{body}$ is not influenced by the gradient of the road in the vehicle advancing direction, it exhibits a forward-back acceleration value of a higher degree of accuracy. Accordingly, where the value obtained by differentiating the vehicle speed $V_{body}$ is used, the stable turning state can be decided with a higher degree of appropriateness.

A condition (decision condition A) for the decision that the current traveling state of the vehicle is a stable turning state is that all of first to sixth conditions are satisfied. In particular, the first condition is that the magnitude $|Yaw_{body}|$ of the yaw rate $Yaw_{body}$ is greater than a predetermined value (threshold value) $Yaw_{SB}$ ($|Yaw_{body}|>Yaw_{SB}$) set in advance. The second condition is that the magnitude |Gx| of the forward-backward acceleration Gx is smaller than a predetermined value (threshold value) $GX_{ST}$ set in advance ($|Gx|<Gx_{ST}$). The third condition is that the magnitude |Gy| of the lateral acceleration Gy is within a range set in advance ($Gy_{SB}<|Gy|<Gy_{ST}$). The fourth condition is that the magnitude $|V_{body}|$ of the vehicle speed $V_{body}$ is within a range set in advance ($V_{SB}<|V_{body}|<V_{ST}$). The fifth condition is that the magnitude |ω| of the steering wheel angular velocity ω is smaller than a predetermined value (threshold value) $ω_{ST}$ set in advance ($|ω|<ω_{ST}$). The sixth condition is that the magnitude |δ| of the steering wheel angle δ is greater than a predetermined value (threshold value) $δ_{SB}$ set in advance ($δ_{SB}<|δ|$).

The conditions above are not only for decision merely of whether or not the vehicle is in a stable turning state but also for decision of whether or not the vehicle is in a stable turning state suitable for learning of the stability factor A. In particular, the calculation of the stability factor A in accordance with the arithmetic operation expression (1) presupposes that, upon steady turning (stable turning), the slip angle of each wheel (tyre) and the lateral force (cornering force) acting upon the wheel (tyre) exhibit a linear relationship, and besides, in order to allow the stability factor A to be calculated with a high degree of accuracy, it is necessary that a slip angle and lateral force of some magnitudes be generated.

The second condition regarding the forward-backward acceleration Gx and the fifth condition regarding the steering wheel angular velocity ω are conditions for steady turning (stable turning). The upper limit condition in the third condition regarding the lateral acceleration Gy and the upper limit condition in the fourth condition regarding the vehicle speed $V_{body}$ correspond to the prerequisite that the slip angle and the lateral force exhibit a linear relationship. The first condition regarding the actual yaw rate $Yaw_{body}$, the lower limit condition in the third condition regarding the lateral acceleration Gy, the lower limit condition in the fourth condition regarding the vehicle speed $V_{body}$ and the sixth condition regarding the steering wheel angle δ correspond to a condition that each of the slip angle and the lateral force is generated with a certain magnitude.

If such conditions are made severe, then the opportunity of calculation of the stability factor A during traveling appears less frequently, but on the contrary if the conditions are made less severe, then the calculation accuracy of the stability factor A during traveling becomes lower. However, in order to make the most of the stability factor A in control of the vehicle substantially on the real time basis while the stability factor A is successively calculated during traveling of the vehicle, it is necessary to assure the opportunity of calculation of the stability factor A during traveling as far as possible and simultaneously assure the accuracy in calculation of the stability factor A.

The conditions for calculating the stability factor A with a predetermined degree of accuracy differ depending upon the mode of turning, and if the conditions are set fixed irrespective of the mode of turning, then such a situation occurs that, although the stability factor A can be calculated accurately in a certain mode of turning, the stability factor A cannot be calculated accurately in another mode of turning. Further, depending upon the mode of turning, even if the conditions are made less severe to increase the opportunity of calculation of the stability factor A, the stability factor A can sometimes be calculated accurately.

Therefore, in the present apparatus, some or all of the predetermined values (threshold values) of the conditions (first to sixth conditions) for the decision of the stable running states that is, $Yaw_{body1}$, $Gx_1$, $Gy_1$, $Gy_2$, $V_{body1}$, $V_{body2}$, $ω_1$ and $δ_1$, are set to different values among different modes of turning of the vehicle.

TABLE 1

|  | Turn to the left | Turn to the right | Medium speed curve | High speed curve |
|---|---|---|---|---|
| $\|Yaw_{body}\|$ | $Yaw_{SB}4\sim$ | $Yaw_{SB}3\sim$ | $Yaw_{SB}2\sim$ | $Yaw_{SB}1\sim$ |
| $\|Gx\|$ | $\sim Gx_{ST}2$ | $\sim Gx_{ST}1$ | $\sim Gx_{ST}1$ | $\sim Gx_{ST}1$ |
| $\|Gy\|$ | $Gy_{SB}2\sim$ | $Gy_{SB}2\sim$ | $Gy_{SB}2\sim$ | $Gy_{SB}1\sim$ |
|  | $Gy_{ST}1$ | $Gy_{ST}1$ | $Gy_{ST}1$ | $Gy_{ST}1$ |
| $V_{body}$ | $V_{SB}1\sim V_{SS}1$ | $V_{SB}2\sim V_{SS}1$ | $V_{SS}1\sim V_{SS}2$ | $V_{SS}2\sim V_{ST}1$ |
| $\|ω\|$ | $\sim ω_{ST}1$ | $\sim ω_{ST}2$ | $\sim ω_{ST}2$ | $\sim ω_{ST}2$ |
| $\|δ\|$ | $δ_{SB}3\sim$ | $δ_{SB}3\sim$ | $δ_{SB}2\sim$ | $δ_{SB}1\sim$ |

It is to be noted that the threshold values of the parameters appearing in Table 1 above have the following relationships:

$Yaw_{SB}1<Yaw_{SB}2<Yaw_{SB}3<Yaw_{SB}4$
$Gx_{ST}1<Gx_{ST}2$
$Gy_{SB}1<Gy_{SB}2<Gy_{ST}1$
$V_{SB}1<V_{SB}2<V_{SS}1<V_{SS}2<V_{ST}1$
$ω_{ST}1<ω_{ST}2$
$δ_{SB}1<δ_{SB}2<δ_{SB}3$

As seen from Table 1, the predetermined values (threshold values) are set to different values depending upon curved road turning wherein the vehicle turns along a curve of a traveling road (curved road) and crossing turning wherein the vehicle turns for turning to the right or to the left at a crossing. Further, the predetermined values (threshold values) are set to different values depending upon whether the vehicle is traveling at a high speed or at a medium speed in the case of curved road turning and depending upon whether the vehicle turns to the right or to the left in the case of turning at a crossing.

It is to be noted that, as seen in Table 1, the decision of whether the turning is curved road turning or crossing turning is performed based on the vehicle speed, and if the vehicle speed $V_{body}$ is equal to or higher than the threshold value $V_{SS}1$ ($V_{SB}<V_{SS}1$) (that is, if the vehicle speed $V_{body}$ is a medium speed or a high speed), then it is decided that the turning is curved road turning, but if the vehicle speed $V_{body}$ is lower than the threshold value $V_{SS}1$ (that is, if the vehicle speed $V_{body}$ is a low speed), then it is decided that the turning is crossing turning. Further, where the vehicle speed $V_{body}$ is equal to or higher than the threshold value $V_{SS}1$ if the vehicle speed $V_{body}$ is equal to or hither than the threshold value $V_{SS}2$ ($V_{SS}1<V_{SS}2$) (that is, if the vehicle speed $V_{body}$ is a high speed), then it is decided that the turning is curved road high speed turning, but if the vehicle speed $V_{body}$ is lower than the threshold value $V_{SS}2$ (that is, if the vehicle speed $V_{body}$ is a medium speed), then it is decided that the turning is curved road medium speed turning.

FIGS. 5(a) to 5(c) are maps wherein the axis of abscissa is the vehicle speed $V_{body}$ and the axis of ordinate is the turning radius R.

If the turning is curved road turning ($V_{body} \geq V_{SS}1$) then the inside of a region indicated as present learning condition in FIG. 5(a) becomes the decision condition (decision condition A) that the current traveling state of the vehicle is a stable turning state. However, the decision condition differs between the middle and high speeds across the boundary of the threshold value $V_{SS}2$. If the turning is the right turning ($V_{body}<V_{SS}1$ and the steering wheel angle indicates right steering), then the inside of a region indicated as present learning condition in FIG. 5(b) becomes the decision condition (decision condition A) that the current traveling state of the vehicle is a stable turning state. If the turning is the left turning ($V_{body}<V_{SS}1$ and the steering wheel angle indicates left steering), then the inside of a region indicated as present learning condition in FIG. 5(c) becomes the decision condition (decision condition A) that the current traveling state of the vehicle is a stable turning state.

The lower limit threshold value $V_{SB}1$ for the vehicle speed $V_{body}$ upon turning to the left at a crossing is set lower than the lower limit threshold value $V_{SB}2$ for the vehicle speed $V_{body}$ upon turning to the right as seen in FIGS. 5(b) and 5(c). This is intended to set the lower limit threshold value $V_{SB}1$ for the vehicle speed $V_{body}$ to a low value so that the calculation opportunity of the stability factor A may be obtained comparatively frequently because, since the turning radius is smaller and the vehicle travels at a considerably reduced speed upon turning to the left, the calculation opportunity of the stability factor A appears less likely. Naturally, setting of the lower limit threshold value $V_{SB}1$ for the vehicle speed $V_{body}$ to a lower value decreases the calculation accuracy of the stability factor A, and therefore, in order to prevent the decrease of the calculation accuracy, the other conditions are set severer.

Here, description is given of how the predetermined values (threshold values) are set for the turning modes of the vehicle.

As described hereinabove, from among the threshold values for the various parameters, the lower limit threshold values $Yaw_{SB}1$, $Yaw_{SB}2$, $Yaw_{SB}3$ and $Yaw_{SB}4$ regarding the yaw rate $Yaw_{body}$ relating to the first condition decrease as the speed increases. This is because, upon high speed turning, even if the yaw rate is comparatively low, the stability factor A can be calculated accurately. Further, while the lower limit threshold values for the yaw rate are higher for the turning to the left than for the turning to the right, this is intended to make the yaw rate conditions severer in order to assure the calculation accuracy of the stability factor A because, since the turning radius is smaller and the vehicle travels at a considerably reduced speed upon turning to the left, the speed condition is set less severe as described hereinabove.

As regards the upper limit threshold values for the forward-backward acceleration Gx regarding the second condition, only the upper limit threshold value $Gx_{ST}2$ upon turning to the left is higher than the upper limit threshold value $Gx_{ST}1$ upon turning to the right or upon curved road turning. This is intended to set the upper limit threshold value $Gx_{ST}2$ for the forward-backward acceleration to a higher value so that the calculation opportunity of the stability factor A may be obtained more frequently because, upon turning to the left, the vehicle is often accelerated from a very low speed traveling state and, if the upper limit threshold value is low, then the calculation opportunity of the stability factor A is very little. Naturally, to set the upper limit threshold value $Gx_{ST}2$ for the forward-backward acceleration to a higher value decreases the calculation accuracy of the stability factor A, and in order to eliminate this, the upper limit threshold value $\omega_{ST}1$ upon turning to the left among the upper limit threshold values for the steering wheel angular velocity $\omega$ regarding the second condition is set severer (lower) than the upper limit threshold value $\omega_{ST}2$ upon turning to the right or upon curved road traveling.

As regards the lower limit threshold values for the lateral acceleration Gy regarding the third condition, only the lower limit threshold value $Gy_{SB}1$ upon curved road high speed turning is lower than the lower limit threshold value $Gy_{SB}2$ upon turning to the right or to the left or upon curved road medium speed turning. The reason is as follows. When the vehicle travels along a curved road at a high speed, the road is in most cases a high-standard road such as a highway, and since the turning radius of such a road as just described is set to a great radius so that, even if a vehicle runs at a specified speed, no high lateral acceleration Gy is generated on the vehicle. Therefore, if the lateral acceleration lower limit threshold value upon curved road high speed turning is set to a high value, then if the driver drives the vehicle at a restricted speed, then no considerable acceleration is generated on the vehicle, and this decreases the calculation opportunity of the stability factor A. Therefore, the lateral acceleration lower limit threshold value upon curved road high speed turning is set to a low value so that the calculation opportunity of the stability factor A can be obtained frequently. It is to be noted that, when the lateral acceleration upon turning is low, although generally the calculation accuracy of the stability factor A is low, where the lateral acceleration is low while the vehicle turns along a curved road at a high speed, the forward-backward acceleration, steering wheel angular velocity and so forth are in most cases low. Thus, synthetically it is considered that the calculation accuracy of the stability factor A is assured.

Further, as regards the lower limit values for the steering wheel angle $\delta$ regarding the sixth condition, the lower limit threshold values $\delta_{SB}1$, $\delta_{SB}2$ upon curved road turning are set lower than the lower limit threshold value $\delta_{SB}3$ upon turning to the right or to the left. This corresponds to the fact that, whereas the steering wheel angle upon turning to the right or left is very great, the steering wheel angle upon curved road turning is not very great. Further, also upon curved road turning, the lower limit threshold value $\delta_{SB}1$ upon curved road high speed turning is set lower than the lower limit threshold value $\delta_{SB}2$ upon curved road medium speed turning. In particular, since a highway or the like which is an principal subject for carrying out curved road high speed turning has a radius of curvature at a curved road portion thereof set greater than that of a general road as described hereinabove, the steering wheel angle upon turning is smaller than that on a general road along which the vehicle performs curved road medium speed turning. Therefore, the lower limit threshold values for the steering wheel angle $\delta$ are set in such a manner as described above.

Incidentally, the learned value setting section 37b of the learning section 37 calculates the stability factor A of the vehicle while it remains decided by the stable turning decision section 37a that the current traveling state of the vehicle is a stable turning state as described above. However, the calculated value is updated as a learned value of the stability factor A of the vehicle when a condition that the duration T of the state wherein the stable turning condition (decision condition A) remains satisfied continues for more than a predetermined time period $T_S$ (decision condition B) is satisfied.

Here, while the stable turning condition (decision condition A) remains satisfied, the stability factor A of the vehicle is calculated in a calculation period $T_C$ set in advance, but at a point of time at which the satisfaction of the stable turning condition (decision condition A) is lost (that is, when the satisfaction of any of the conditions 1 to 6 is lost), it is decided whether or not the duration T (=calculation period $T_C$×calculation time number n) within which the stable turning condition (decision condition A) remains satisfied is equal to or longer than the predetermined time period $T_S$. Then, if the duration T is equal to or longer than the predetermined time period $T_S$, then the average value $A_{AVE}$ (=$\Sigma A_K/n$) of the integrated value $\Sigma A_K$ (=$A_1+A_2+\ldots+A_n$) of the stability factor for the calculation time number n is calculated.

The learned value setting section 37b stores the average value $A_{AVE}$ as a learned value $A_S$, and the learning section weights the new learned value $A_S$ (=average value $A_{AVE}$) in accordance with the following expression (4) to correct the controlling stability factor value $A_{n-1}$, before the learning to calculate a controlling stability factor value $A_n$ on which the learning is reflected:

$$A_n = A_{n-1} \times (1-W) + A_S \times W \qquad (4)$$

where W is a weighting coefficient for causing a result of the learning to be reflected on the controlling stability factor value $A_n$.

The controlling stability factor value $A_n$ calculated in this manner is used for calculation of the target yaw rate $Yaw_{tgt}$ which is executed by the vehicle motion state inputting section 32 using the expression (2) given hereinabove.

It is to be noted that, if the satisfaction of the stable turning condition (decision condition A) is lost before the duration T becomes equal to or longer than the predetermined time period $T_S$, then the learning is invalidated.

The reason why the duration of the state wherein the stable turning condition (decision condition A) remains satisfied is used as a condition is that it is intended to calculate the stability factor A with a high degree of accuracy.

In the present embodiment, the predetermined time period $T_S$ according to the condition of the duration is set to delicately different values among the different turning modes. In particular, the predetermined time period $T_S$ upon curved road medium speed turning is set comparatively long while the predetermined time period $T_S$ upon curved road high speed turning is set comparatively short and the predetermined time period $T_S$ upon turning to the left and right is set to an intermediate value.

The reason why the predetermined time period $T_S$ upon curved road medium speed turning is set comparatively long is that, upon such turning, the stable turning condition (decision condition A) is in most cases satisfied and it is considered that, even if the predetermined time period $T_S$ is set comparatively long with importance attached to the calculation accuracy of the stability factor A, the opportunity of learning of the stability factor A is obtained comparatively frequently. The reason why the predetermined time period $T_s$ upon curved road high speed turning is set comparatively short is that, upon such turning, the case wherein the stable turning condition (decision condition A) is satisfied appears less frequently and it is intended to assure the opportunity of learning of the stability factor A rather than the calculation accuracy of the stability factor A.

The predetermined time period $T_S$ upon turning to the right or left is set in response to a period of turning time upon actual turning to the right or left so that the opportunity of learning of the stability factor A can be obtained sufficiently upon turning to the right or left. Since the turning radius is smaller but the vehicle speed is lower upon turning to the left and besides the decision condition A is set to different conditions between turning to the right and turning to the left, the stable turning condition (decision condition A) is likely to continue longer than that upon turning to the right. Therefore, the predetermined time period $T_S$ upon turning to the left is set rather longer than the predetermined time period $T_S$ upon turning to the right thereby to assure balancing between the assurance of the calculation accuracy of the stability factor A and the assurance of the learning opportunity of the stability factor A.

Figure 6:
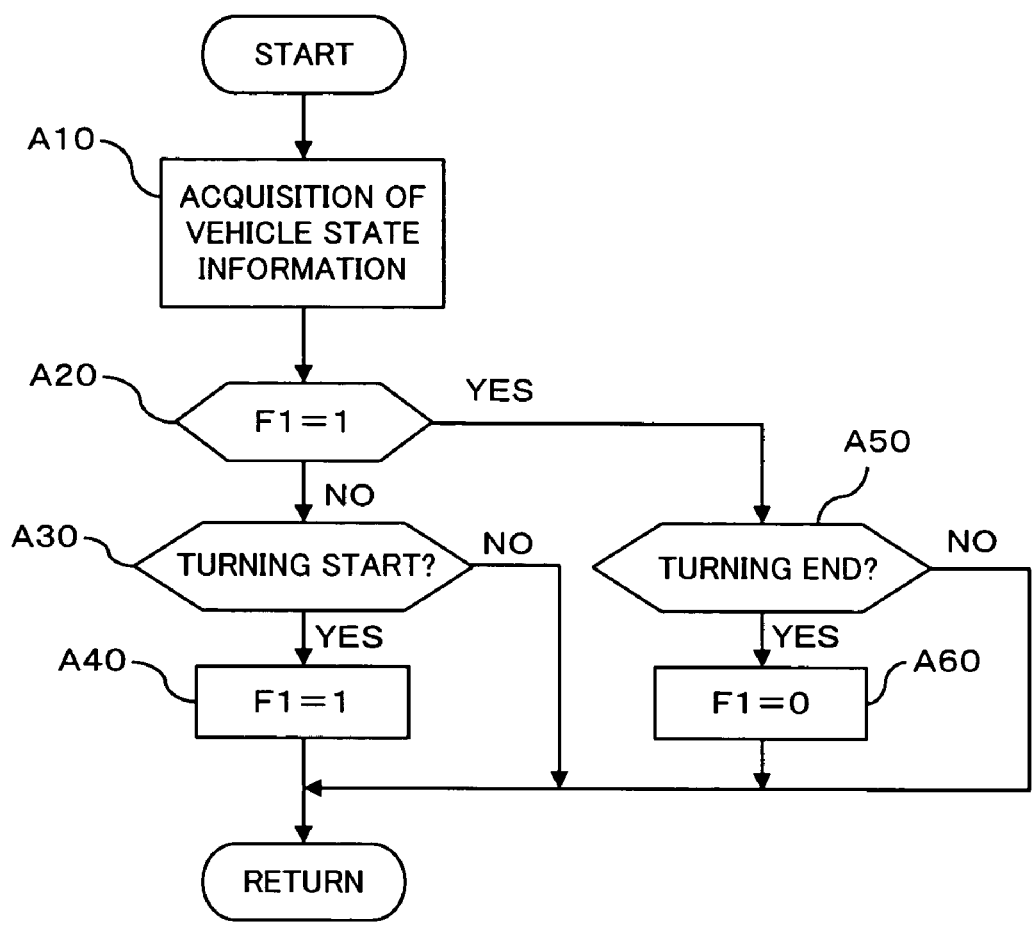
FIG. 6 is a flow chart illustrating a turning decision in the learning method and the vehicle control in the embodiment of the present invention.
Figure 7:
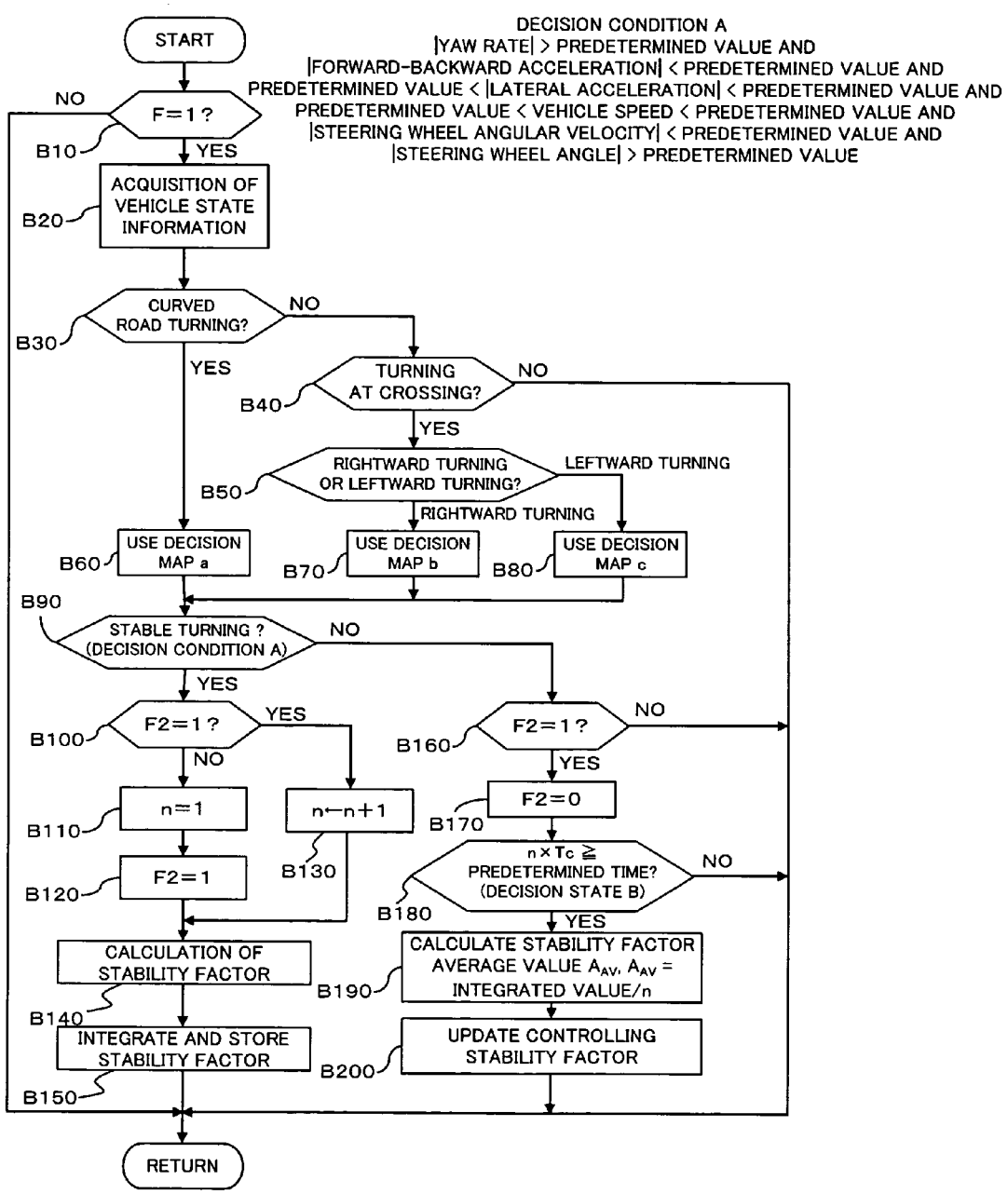
FIG. 7 is a flow chart illustrating the learning method of the embodiment of the present invention.

The stability factor learning apparatus according to the embodiment of the present invention is configured in such a manner as described above, and a stability factor learning method according to the present embodiment is carried out, for example, in such a manner as illustrated in flow charts of FIGS. 6 and 7. The process of the flow charts of FIGS. 6 and 7 is carried out in a control cycle (calculation cycle) set in advance.

In particular, as seen from the turning decision routine of FIG. 6, vehicle turning information detected by the vehicle state detection section is acquired first (step A10), and then it is decided based on a flag F1 whether or not it was decided in the preceding decision that the vehicle was turning (step A20). The flag F1 is a turning decision flag and has a value of 1 when the vehicle is turning but has another value of 0 when the vehicle is not turning. The initial value of the flag F1 is 0. If the vehicle was not turning in the preceding cycle, then the processing advances to step A30, at which it is decided whether or not turning of the vehicle is started. If turning of the vehicle is started, then the flag F1 is set to 1 (step A40). If the vehicle was turning in the preceding cycle, then the processing advances from step A20 to step A50, at which it is decided whether or not the turning of the vehicle is ended. If the turning of the vehicle is ended, then the flag F1 is reset to 0 (step A60).

The decisions of the start and the end of turning at steps A30 and A50 are performed such that, for example, if the magnitude of the steering wheel angle δ becomes higher than a predetermined turning decision threshold value (in this instance, the lower limit threshold value $δ_{SB}1$ upon curved road high speed turning which is a steering wheel angle lower limit value for the stable turning decision may possibly be used as the turning decision threshold value), then it is decided that the vehicle starts turning, but if the magnitude of the steering wheel angle δ becomes equal to or lower than the predetermined turning decision threshold value, then it is decided that the turning comes to an end.

On the other hand, as seen from the stability factor learning routine of FIG. 7, it is first decided based on the flag F1 whether or not the vehicle is turning (step B10). If the vehicle is turning, then vehicle state information detected by the vehicle state detection section is acquired (step B20), and it is decided whether or not the turning is curved road turning (step B30). This decision is made based on the vehicle speed. In particular, if the vehicle speed $V_{body}$ is in the medium speed region equal to or higher than the threshold value $V_{SS}1$, then the turning is curved road turning, but if the vehicle speed $V_{body}$ is in the low speed region lower than the threshold value $V_{SS}1$, then it is decided that the turning is not curved road turning.

If the turning is curved road turning, then it is determined to use the decision map a illustrated in FIG. 5(a) (step B60). If the turning is not curved road turning, then it is decided whether or not the turning is crossing turning (turning to the right or left) (step B40). If the turning is crossing turning, then it is decided whether the turning is rightward turning (turning to the right) or leftward tuning (turning to the left) (step B50). Here, the decision of whether or not the turning is crossing turning can be made depending upon whether or not the steering wheel angle δ is equal to or greater than a predetermined threshold value (for example, $δ_{SB}3$), and the decision of whether the turning is turning to the right or turning to the left can be made from the direction of the steering wheel angle δ.

Then, if the turning is rightward turning, then it is determined to use the decision map b shown in FIG. 5(b) (step B70), but if the tuning is leftward turning, then it is determined to use the decision map c shown in FIG. 5(c) (step B80).

After a decision map is selected in this manner, it is decided based on the decision condition A described hereinabove whether or not the turning in the present cycle is stable turning (step B90).

If the turning is stable turning, then it is decided whether or not a stable turning decision flag F2 is 1 (step B100). The stable turning decision flag F2 is set to 1 if it is decided that the vehicle is in a stable turning state, but is set to 0 if it is decided that the vehicle is not in a stable turning state. The initial value of the stable turning decision flag F2 is 0.

If it is decided that the turning in the present cycle is stable turning although it was not decided in the preceding cycle that the turning was stable turning, then since the stable turning decision flag F2 is 0, the processing advances to step B110, at which counting of the stability factor arithmetic operation time number n is started (n=1). Then, the stable turning decision flag F2 is set to 1 (step B120). Then, the stability factor A is arithmetically operated in accordance with the expression (1) given hereinabove from the vehicle information acquired at step B20 (step B140), and then the integrated value $\Sigma A$ of the stability factor A is stored (step B150).

As the stability turning is successively decided at step B90 in this manner, the calculation time number n is successively incremented, and the integrated value $\Sigma A$ of the stability factor A at step B150 becomes a value obtained by the n arithmetic operations.

For example, if the stable running state is lost in the n+1th cycle after the stable running state continues for n cycles, then the processing advances from step B90 to step B160, at which it is decided whether or not the stable turning decision flag F2 is 1. Here, since the vehicle was in a stable turning state in the preceding cycle and F2=1, the processing advances first to step B170, at which the stable turning decision flag F2 is reset to F2=0, and then to step B180, at which the decision condition B is decided, that is, it is decided whether or not the duration T (=n×$T_C$) of the stable turning state is equal to or longer than the predetermined time period $T_S$ described hereinabove.

Here, if the duration T is not equal to or longer than the predetermined time period $T_S$, then it is determined that the learning in the present cycle is ineffective, and the processing is ended. However, if the duration T is equal to or longer than the predetermined time period $T_S$, then the integrated value $\Sigma A$ of the stability factor A calculated at step B150 is divided by the calculation time number n to calculate the stability factor average value $A_{AVE}$ (step B190). Then, the controlling stability factor value $A_n$ is updated in accordance with the expression (4) given hereinabove using the stability factor average value $A_{AVE}$ as the learned value $A_S$ (step B200).

Figure 8:
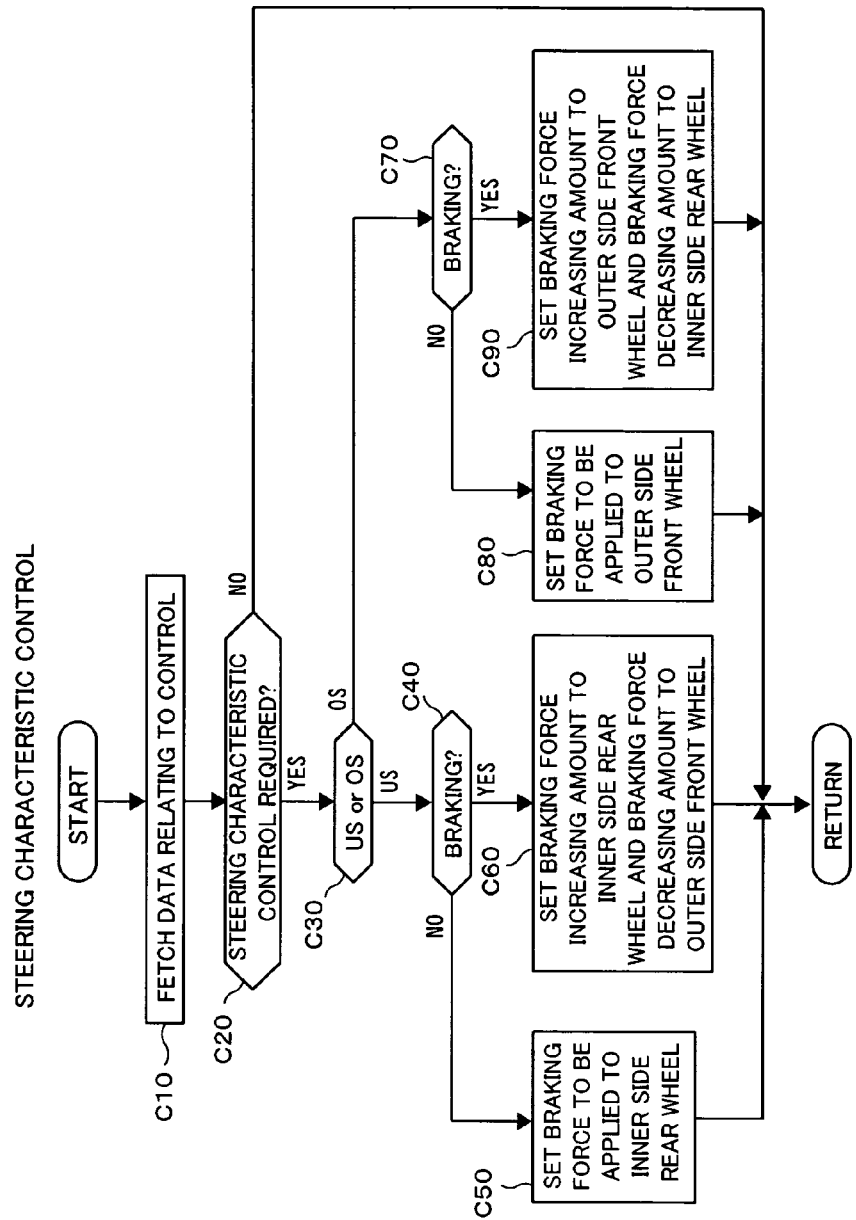
FIG. 8 is a flowchart illustrating yaw moment control (steering characteristic control) as the vehicle control of the embodiment of the present invention.

On the other hand, the yaw moment control apparatus (steering characteristic control apparatus) as a control apparatus for a vehicle of the present embodiment uses the controlling stability factor value $A_n$ updated in such a manner as described above during traveling to carry out control, for example, in such a manner as illustrated in FIG. 8.

Referring to FIG. 8, data relating to the control are fetched first (step C10), and it is decided whether or not steering characteristic control (yaw moment control) is required (step C20). If steering characteristic control (yaw moment control) is required, then it is decided whether the control should be control for understeer or for oversteer (step C30).

If the control is for understeer, then it is decided whether or not the vehicle is under braking operation (step C40). If the vehicle is not under braking operation, then a braking force (brake fluid pressure) application amount is set in accordance with the yaw rate deviation $\Delta Yaw$ so that braking force may be applied to the rear wheel 5RL or 5RR from between the turning inner wheels as seen in FIG. 4(a) (step C50). If the vehicle is under braking operation, then the increasing amount and the decreasing amount of the braking force (brake fluid pressures) are set in accordance with the yaw rate deviation $\Delta Yaw$ so that the braking force to the rear wheel 5RL or 5RR from between the turning inner wheels may be increased and the braking force to the front wheel 5FR or 5FL from between the turning outer wheels may be decreased (step C60).

On the other hand, if the control is for oversteer, then it is decided whether or not the vehicle under in braking operation (step C70). If the vehicle is not under braking operation, then a braking force (brake fluid pressure) application amount is set in accordance with the yaw rate deviation $\Delta Yaw$ so that braking force may be applied to the front wheel 5FL or 5FR from between the turning outer wheels as seen in FIG. 4(b) (step C80). If the vehicle is under braking operation, then the increasing amount and the decreasing amount of the braking force (brake fluid pressures) are set in accordance with the yaw rate deviation $\Delta Yaw$ so that the braking force to the front wheel 5FL or 5FR from between the turning outer wheels may be increased and the braking force to the rear wheel 5RR or 5RL from between the turning inner wheels may be decreased (step C90).

While the target yaw rate $Yaw_{tgt}$ is used for calculation of the yaw rate deviation $\Delta Yaw$ at steps C50, C60, C80 and C90, the controlling stability factor value $A_n$ is used for calculation of the target yaw rate $Yaw_{tgt}$.

Then, the brake system is controlled in accordance with the increasing amount and the decreasing amount of the braking force (brake fluid pressure) for the wheels set by the yaw moment control section 33.

In this manner, according to the present learning method or apparatus, it is decided whether or not the traveling state of the vehicle during traveling is a stable turning state, and if the vehicle is in a stable turning state, then the stability factor A of the vehicle is calculated based on detection data of the vehicle speed $V_{body}$, steering wheel angle $\delta$ and yaw rate $Yaw_{body}$ obtained during traveling. Therefore, even if the position of the center of gravity of the vehicle, a tyre mounted on the vehicle, the suspension characteristic or the vehicle rigidity varies, the stability factor A conforming to the variation can be calculated rapidly during traveling.

Since the stability factor of the vehicle can be calculated substantially on the real time basis in response to the state of the vehicle in this manner, if vehicle control such as yaw moment control is performed using the stability factor A obtained by the present learning method and apparatus, then the vehicle control can be performed appropriately in accordance with the vehicle state.

Further, where the stability factor is calculated during traveling, the calculation frequency and the calculation accuracy have a mutually tradeoff relationship, and if it is tried to increase the calculation frequency, then the calculation accuracy reduces, but if it is tried to raise the calculation accuracy, then the calculation frequency decreases. However, with the present learning method and apparatus, since the condition for calculation of the stability factor (decision conditions A and B) is set to unique conditions among different modes of turning, the calculation frequency and the calculation accuracy can be balanced well and a stability factor of a certain degree of accuracy can be obtained at certain frequencies. Consequently, there is an advantage that the utility regarding control for a vehicle can be raised.

The present invention is not limited to the embodiment specifically described above, and variations and modifications can be made without departing from the scope of the present invention.

For example, while the control for a vehicle described in the foregoing description is yaw moment control (steering characteristic control) in which the brake system is used, the control for a vehicle to which the present learning method or apparatus can be applied is not limited to this, but it can be applied to various kinds of control for a vehicle which use the stability factor such as, for example, control for a vehicle which controls the yaw moment by controlling the torque distribution to the driving wheels or four-wheel steering control.

What is claimed is:

1. A stability factor learning method for a vehicle for learning a stability factor of said vehicle in a state of said vehicle during traveling, comprising:

a decision step of detecting a state of said vehicle during traveling and deciding based on the detection information whether or not the current traveling state of said vehicle is a stable turning state; and a learning step of calculating, based on a vehicle body speed $V_{body}$, a steering angle $\delta$ and a yaw rate $Yaw_{body}$ detected during traveling, a stability factor A of said vehicle in accordance with an arithmetic operation expression (1):

$$A = \left( \frac{V_{body} \cdot \delta}{Yaw_{body} \cdot L} - 1 \right) \frac{1}{V_{body}^2} \quad (1)$$

and then setting, if it is decided at the decision step that the current traveling state of said vehicle is a stable turning state, the calculated value as a learned value of the stability factor A of said vehicle.

2. The stability factor learning method for a vehicle as claimed in claim 1, wherein a decision condition that the current traveling state of said vehicle is a stable turning state at the decision step is that all of a first condition that the magnitude of the yaw rate of said vehicle is equal to or higher than a predetermined value set in advance, a second condition that the magnitude of a forward-backward acceleration of said vehicle is lower than a predetermined value set in advance, a third condition that the magnitude of a lateral acceleration of said vehicle is within a range set in advance, a fourth condition that the vehicle speed is within a range set in advance, a fifth condition that the magnitude of a steering angular velocity of said vehicle is smaller than a predetermined value set in advance and a sixth condition that the magnitude of the steering angle of said vehicle is equal to or greater than a predetermined value set in advance are satisfied, and a learning condition that the calculated value according to the arithmetic operation expression (1) at the learning step is set to the learned value of the stability factor A of said vehicle is set to that the state wherein all of the first to sixth conditions are satisfied continues for a predetermined period of time set in advance or more.

3. The stability factor learning method for a vehicle as claimed in claim 2, wherein, at the learning step, if all of the first to sixth conditions are satisfied, the stability factor A is calculated repetitively in a predetermined cycle until any of the first to sixth conditions becomes unsatisfied, and then upon the arithmetic operation, if the state wherein all of the first to sixth conditions are satisfied continues for the predetermined period of time or more, an average value of results of the arithmetic operation performed in the predetermined cycle is calculated and used to update the learned value of the stability factor A of said vehicle.

4. The stability factor learning method for a vehicle as claimed in claim 2, wherein the predetermined values and the ranges included in the decision condition are set to those which differ among different turning modes of said vehicle.

5. The stability factor learning method for a vehicle as claimed in claim 3, wherein the predetermined values and the ranges included in the decision condition are set to those which differ among different turning modes of said vehicle.

6. The stability factor learning method for a vehicle as claimed in claim 5, wherein, when the turning speed of said vehicle is a low vehicle speed corresponding to that upon turning to the right or turning to the left, the predetermined values and the ranges included in the decision condition are set to those which differ between turning to the left and turning to the right.

7. A stability factor learning apparatus for a vehicle for use with the stability factor learning method for a vehicle as claimed in claim 1, comprising:

vehicle state detection means for detecting a traveling state or an operation state of said vehicle, said vehicle state detection means including yaw rate detection means for detecting a yaw rate generated on said vehicle, vehicle speed detection means for detecting a vehicle speed and steering angle detection means for detecting a steering angle of said vehicle;

decision means for deciding based on the detection information from said vehicle state detection means whether or not the current traveling state of said vehicle is a stable turning state; and learned value setting means for calculating, based on a vehicle body speed $V_{body}$, a steering angle $\delta$ and a yaw rate $Yaw_{body}$ obtained from said vehicle state detection means during traveling while it remains decided by said decision means that the current traveling state of said vehicle is a stable turning state, a stability factor A of said vehicle in accordance with the arithmetic operation expression (1) and then setting the calculated value as a learned value of the stability factor A of said vehicle.

8. A control apparatus for a vehicle, comprising:

a stability factor leaning apparatus for a vehicle as claimed in claim 7; and control means for controlling said vehicle based on a stability factor learned value learned by said learning apparatus;

a controlling stability factor for use for the control of said vehicle being determined by weighted averaging a controlling stability factor in a preceding cycle and the latest stability factor learned value with weighting coefficients set in advance.

9. A stability factor learning apparatus for a vehicle for use with the stability factor learning method for a vehicle as claimed in claim 1, comprising:

a vehicle state sensor for detecting a traveling state or an operation state of said vehicle, said vehicle state sensor including a yaw rate sensor for detecting a yaw rate generated on said vehicle, a vehicle speed sensor for detecting a vehicle speed and a steering angle sensor for detecting a steering angle of said vehicle; and an electronic control unit including a decision section for deciding based on the detection information from said vehicle state sensor whether or not the current running state of said vehicle is a stable turning state and a learned value setting section for calculating, based on a vehicle body speed $V_{body}$, a steering angle $\delta$ and a yaw rate $Yaw_{body}$ obtained from said vehicle state sensor during traveling while it remains decided by said decision means that the current traveling state of said vehicle is a stable turning state, a stability factor A of said vehicle in accordance with the arithmetic operation expression (1) and setting the calculated value as the learned value of the stability factor A of said vehicle.

10. A control apparatus for a vehicle, comprising:

a stability factor leaning apparatus for a vehicle as claimed in claim 9; and control means for controlling said vehicle based on a stability factor learned value learned by said learning apparatus;

a controlling stability factor for use for the control of said vehicle being determined by weighted averaging a controlling stability factor in a preceding cycle and the latest stability factor learned value with weighting coefficients set in advance.

* * * * *

UNITED STATES PATENT AND TRADEMARK OFFICE
CERTIFICATE OF CORRECTION

PATENT NO. : 6,941,212 B2
DATED : September 6, 2005
INVENTOR(S) : Kunio Sakata

It is certified that error appears in the above-identified patent and that said Letters Patent is hereby corrected as shown below:

Title page,
Item [22], PCT Filed, the filing date should be shown as -- September 29, 2004 --.

Signed and Sealed this

First Day of November, 2005

JON W. DUDAS
*Director of the United States Patent and Trademark Office*